US010457002B2

(12) United States Patent
Ender et al.

(10) Patent No.: US 10,457,002 B2
(45) Date of Patent: Oct. 29, 2019

(54) METHOD AND APPARATUS FOR TREATING AN OBJECT

(71) Applicant: Airbus Operations GmbH, Hamburg (DE)

(72) Inventors: Tobias Ender, Hamburg (DE); Alexander Bruns, Hamburg (DE); Oliver Seack, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 218 days.

(21) Appl. No.: 15/357,138

(22) Filed: Nov. 21, 2016

(65) Prior Publication Data

US 2017/0151724 A1 Jun. 1, 2017

(30) Foreign Application Priority Data

Nov. 26, 2015 (EP) .................................... 15196608

(51) Int. Cl.
| | |
|---|---|
| *B29C 67/00* | (2017.01) |
| *B29C 71/00* | (2006.01) |
| *B33Y 40/00* | (2015.01) |
| *B22F 3/105* | (2006.01) |
| *B22F 3/15* | (2006.01) |
| *B28B 1/00* | (2006.01) |

(Continued)

(52) U.S. Cl.
CPC ........ *B29C 71/0009* (2013.01); *B22F 3/1055* (2013.01); *B22F 3/156* (2013.01);
(Continued)

(58) Field of Classification Search
None
See application file for complete search history.

(56) References Cited

U.S. PATENT DOCUMENTS

| | | | | |
|---|---|---|---|---|
| 3,869,233 A | * | 3/1975 | Witkin | ..................... B22F 3/04 425/405.2 |
| 3,907,550 A | | 9/1975 | Critchlow | |

(Continued)

FOREIGN PATENT DOCUMENTS

| | | |
|---|---|---|
| CA | 900169 | 5/1972 |
| CN | 1861296 A | 11/2006 |

(Continued)

OTHER PUBLICATIONS

European Search Report, dated May 24, 2016 priority document.
Chinese Office Action; corresponding Chinese Patent Application No. 201611056672.X.

*Primary Examiner* — Monica A Huson
(74) *Attorney, Agent, or Firm* — Greer, Burns & Crain, Ltd.

(57) ABSTRACT

An apparatus and a method for treating an object manufactured from a material having a defined melting temperature, by subjecting the object to hot isostatic pressing to reduce porosity and increase a density thereof. The method comprises arranging the object in a pressure chamber interior cavity, submerged in a liquid partially filling the cavity, heating the liquid to a below melting temperature, pressurizing the liquid by pressurizing gas above a liquid surface in the cavity, then moving the object out of the liquid, but still within the cavity, subsequently heating the liquid to an above melting temperature, and resubmerging the object in the liquid. Subsequently, the object is withdrawn from the liquid and moved above the liquid. The apparatus comprises the pressure chamber, a movable object support in the cavity, a liquid heater, and a gas inlet and outlet selectively introducing gas into and venting gas from the cavity.

16 Claims, 10 Drawing Sheets

(51) Int. Cl.
    *B28B 11/00*     (2006.01)
    *B29C 71/02*     (2006.01)
    *B22F 3/24*     (2006.01)
    *B33Y 10/00*     (2015.01)
    *B29C 64/379*     (2017.01)

(52) U.S. Cl.
    CPC ............... *B22F 3/24* (2013.01); *B28B 1/001* (2013.01); *B28B 11/00* (2013.01); *B29C 71/02* (2013.01); *B33Y 40/00* (2014.12); *B22F 2003/153* (2013.01); *B22F 2998/10* (2013.01); *B22F 2999/00* (2013.01); *B29C 64/379* (2017.08); *B33Y 10/00* (2014.12); *Y02P 10/295* (2015.11)

(56) References Cited

U.S. PATENT DOCUMENTS

| | | | | |
|---|---|---|---|---|
| 4,264,556 A | * | 4/1981 | Kumar | ............ B22F 3/04 264/314 |
| 2012/0060704 A1 | * | 3/2012 | Wilkinson | ......... B23K 20/021 100/35 |
| 2015/0017475 A1 | | 1/2015 | Ward-Close | |

FOREIGN PATENT DOCUMENTS

| | | |
|---|---|---|
| CN | 103008657 A | 4/2013 |
| CN | 103752824 A | 4/2014 |
| CN | 105033252 A | 11/2015 |

* cited by examiner

METHOD AND APPARATUS FOR TREATING AN OBJECT

CROSS-REFERENCES TO RELATED APPLICATIONS

This application claims the benefit of the European patent application No. 15196608.2 filed on Nov. 26, 2015, the entire disclosures of which are incorporated herein by way of reference.

BACKGROUND OF THE INVENTION

The present invention relates to a method for treating an object manufactured, in particular by additive manufacturing, from a material having a defined melting temperature, wherein the treatment comprises subjecting the object to hot isostatic pressing for reducing the porosity and increasing the density of the object.

Generative or additive manufacturing methods are increasingly being used to produce prototypes or completed components very quickly. In contrast to conventional production processes, which comprise removing material from a block of material by, for example, milling, cutting, drilling or other machining processes, additive manufacturing methods construct a desired three-dimensional object directly layer by layer based on a digital description or representation of the object. They are also known as 3D printing or rapid prototyping.

Specific examples for additive manufacturing methods are the so-called selective laser melting (SLM) and the so-called selective electron beam melting, in which a laser beam and an electron beam, respectively, is used to irradiate and melt selected portions of layers of materials, which are successively applied to a support. Another example is the so-called fused deposition modeling, in which a heated and movable extrusion nozzle dispenses molten material to build the desired object. Generally, many additive manufacturing methods are based on melting or fusing and solidifying a meltable material, in particular a metal or thermoplastic material.

Irrespective of the specific type of additive manufacturing method, as explained above, the object is constructed directly layer by layer in a three-dimensional manner. This makes it possible to produce different highly complex objects efficiently and quickly in the same device from different materials, in particular from metal but also from plastic materials, and in particular thermoplastic materials, and ceramic materials. For example, highly complex grid or honeycomb structures or other highly complex structures which cannot be generated, or can only be generated with difficulty, using other processes can be easily produced. In comparison with traditional production processes, the complexity of the object has only a limited influence on the production costs.

Additive manufacturing, combined with topology optimized design, provides an opportunity to save weight for structures like aircraft. In particular, an optimization as to minimum weight is possible while taking into consideration requirements such as stiffness, strength and stability.

However, objects manufactured by additive manufacturing typically have a relative high porosity and a relative high surface roughness. It is desirable to reduce the porosity and the surface roughness as much as possible in order to further improve the fatigue properties of the object manufactured. The same may also be true for objects manufactured by other methods.

Hot isostatic pressing is a known process for reducing the porosity of objects to thereby improve the mechanical properties and the workability of an object. For this purpose, the object is arranged in a pressure chamber and subjected to both an elevated temperature and a high isostatic pressure, for example by arranging the object in a heated and pressurized liquid, such as oil. Since the high isostatic pressure is applied to the object from all directions, the object is compacted without changing its shape.

While various processes for reducing surface roughness are generally known, they are difficult to apply to objects having a complex shape, in particular if they have interior surfaces which are difficult to access.

Typical known surface smoothing methods involve mechanical grinding or polishing using an abrasive medium, chemical or electrochemical polishing, or the use of abrasive liquids. Hollow structures manufactured using additive manufacturing have interior surfaces which can hardly be reached by these methods, in particular if the hollow structures are divided into interior subspaces by walls or other portions of the structures. Only electrochemical polishing or abrasive liquids have the potential of providing sufficient access to hollow structures. However, electrochemical polishing tends not to produce homogenous results, because the distance between anode and cathode varies, and abrasive liquids cannot reach all small corners evenly or do have the same level of abrasion across the whole surface depending on the structural layout.

SUMMARY OF THE INVENTION

It is therefore an object of the present invention to provide a method for treating an object, and, in particular, an object manufactured by additive manufacturing, to reduce the porosity and the surface roughness, which method is simple to carry out and produces homogenous results, and to provide an apparatus for carrying out the method.

The present invention provides a method for treating an object manufactured from a material having a defined melting temperature, preferably for treating an object manufactured by additive manufacturing from a material having a defined melting temperature. The method generally comprises a first phase or stage, in which hot isostatic pressing is carried out in order to achieve a reduction in the porosity of the object and an increase in the density of the object, and a subsequent second phase or stage, in which the surface roughness of the object is reduced.

Subjecting the object to hot isostatic pressing comprises arranging the object inside an interior cavity of a pressure chamber and submerging the object in a liquid which is disposed inside the interior cavity. Importantly, the liquid fills the interior cavity only partially, such that the liquid has a free liquid surface above which a portion of the interior cavity, i.e., a space not filled by the liquid, is located. It is to be noted that the portion of the interior cavity above the free liquid surface may change in the course of the method with a changing level or position of the free liquid surface, e.g., due to adding liquid into the interior cavity or removing some of the liquid from the interior cavity. Even if the amount of liquid in the interior cavity is not changed, the level or position of the free liquid surface will generally be different when the object is submerged in the liquid as compared to when the object is not submerged in the liquid. Further, it is also to be noted that submerging of the object may be carried out by at first filling the liquid into or providing the liquid in the interior cavity and then moving the object from a portion of the interior cavity above the free liquid surface through the free liquid surface into the liquid, or by at first arranging the object within the interior cavity in a position corresponding to the liquid to be filled in and then filling in the liquid. The liquid is heated to a first temperature below the melting temperature and pressurized by providing pressurized gas in a portion of the interior cavity above the free liquid surface. Each of the heating and pressurizing steps can be carried out prior to or after submerging the object in the liquid. Further, although heating the liquid inside the interior cavity is preferred, it is also possible to heat the liquid outside the interior cavity and to then introduce the liquid into the interior cavity.

After the liquid has been heated to the first temperature and pressurized by the pressurized gas and the object has been submerged in the liquid, the object is maintained inside the liquid, so that the porosity of the object is reduced and the density is increased by the isostatic pressure applied by the liquid to the object. During this stage the temperature of the liquid is preferably controlled and maintained at the first temperature by appropriate heating. Then, the object is arranged outside the liquid in a portion of the interior cavity above the free liquid surface, thereby terminating the hot isostatic pressing. This may be preferably done by withdrawing the object from the liquid and moving it into a portion of the interior cavity above the free liquid surface, and/or by removing a part of the liquid from the interior cavity to decrease the level or position of the free liquid surface. The period of time during which the object is submerged in the liquid and the isostatic pressure is applied to the object depends on the desired reduction in porosity and is preferably predetermined.

Following this hot isostatic pressing stage and while the object is disposed outside the liquid in a portion of the interior cavity above the free liquid surface, the liquid is heated to a second temperature above the melting temperature of the object, which surface should be treated. After the liquid has been heated to the second temperature, the object is moved from a portion of the interior cavity above the free liquid surface into the liquid, so that the object is submerged again within the liquid. Due to the fact that the second temperature is above the melting temperature, this submerging causes melting of the object starting with the surface layer and thereby resulting in a reduction of the surface roughness of the object. Once the desired reduction of the surface roughness is achieved, the object is withdrawn from the liquid and moved once again into a portion of the interior cavity above the free liquid surface. In other words, the object is "briefly dipped" into the liquid having a temperature above the melting temperature in order to reduce the surface roughness while maintaining the shape of the object otherwise. The time period is chosen such that only the rough surface and possible minor cracks are affected, but not the whole cross section of the object, i.e., there is no overall deformation of the object. The time period is preferably predetermined. The second temperature is preferably chosen to be so high that the temperature of the liquid does not fall below the melting temperature during the submerging step and before the surface of the object reaches the melting temperature. Alternatively, during the submerging step the temperature of the liquid may be controlled and maintained by appropriate heating at the second temperature or at a temperature or in a temperature range between the melting temperature and the second temperature.

The above method provides the advantage that polishing is effected in a very efficient way by means of the hot liquid which is reliably and quickly able to reach all areas of the treated object so that even interior surfaces of hollow structures are wetted as long as they have holes through which the liquid can enter and gas can exit. Thus, different from known processes, the surface roughness of complex structures can be uniformly decreased. Due to the surface tension of the melted material on the surface of the object, a reduction of surface roughness is reliably achieved, and open porosities or cracks in the surface will be filled with melted material. Further, surface irregularities projecting from and mechanically attached to the surface are leveled out. The value of the second temperature may be determined, among other criteria, depending on the dimensions and shape of the object. The combination with the hot isostatic pressing renders the method particularly simple, quick and efficient, and together they serve to improve the fatigue characteristics of the manufactured object, and in particular if the object is manufactured by additive manufacturing.

In a preferred embodiment the object is supported by a support arrangement, which is located inside the interior cavity and which is movable inside the interior cavity to thereby enable selectively submerging the object in the liquid, arranging the object outside the liquid in a portion of the interior cavity above the free liquid surface and withdrawing the object from the liquid and moving it into the portion of the interior cavity above the free liquid surface, i.e., selectively changing or moving the object in the manner described above between a submerged position and a position above the free liquid surface. The support arrangement may advantageously be or comprise, e.g., a cage or other receptacle, inside of which the object is located and supported and which comprises a plurality of slots or other openings through which the liquid can enter and exit the cage or other receptacle. The step of submerging the object in the liquid after the liquid has been heated to the second temperature and the subsequent step of withdrawing the object from the liquid and moving it into a portion of the interior cavity above the free liquid surface during the roughness reducing stage are carried out by moving the support arrangement inside the interior cavity. Preferably, the step of submerging the object in the liquid heated to the first temperature and/or the step of arranging the object outside the liquid in a portion of the interior cavity above the free liquid surface during the hot isostatic pressing stage is likewise carried out by or involves moving the support arrangement inside the interior cavity.

In this embodiment, the above-described movement of the support arrangement, i.e., the movement for selectively submerging the object in the liquid and withdrawing the object from the liquid and moving it into a portion of the interior cavity above the free liquid surface, and possibly also for submerging the object in the liquid heated to the first temperature and/or for arranging the object outside the liquid in a portion of the interior cavity above the free liquid surface during the hot isostatic pressing stage, may preferably be effected by moving the support arrangement along a translational and preferably linear path between a first position and a second position. The first position may then be a position in which the entire support arrangement—or at least the entire object supported by it—is withdrawn from or arranged outside the liquid and disposed in a portion of the interior cavity above the free liquid surface, and the second position may be a position in which the entire support arrangement—or at least the entire object supported by it—is submerged in the liquid.

Alternatively, the above-described movement of the support arrangement—i.e., the movement for selectively submerging the object in the liquid and withdrawing the object from the liquid and moving the object into a portion of the interior cavity above the free liquid surface, and possibly also for submerging the object in the liquid heated to the first temperature and/or for arranging the object outside the liquid in a portion of the interior cavity above the free liquid surface during the hot isostatic pressing stage—may preferably be effected by rotating the support arrangement about a rotational axis. The support arrangement is then mounted inside the interior cavity to be rotatable about the rotational axis and preferably configured such that it can support an object in such a manner that when rotating the support arrangement about the rotational axis, the object moves along a circular path about the rotational axis between the first and second positions. The first position may then be a position in which the entire object—and possibly also the entire support arrangement—is withdrawn from or arranged outside the liquid and disposed in a portion of the interior cavity above the free liquid surface, and the second position may be a position in which the entire object—and possibly also a part of the support arrangement—is submerged in the liquid. Preferably, the support arrangement is continuously rotatable over more than 360°, so that it is possible to move from the first position to the second position and again to the first position by rotating the support arrangement in one rotational direction. A rotational movement of the support arrangement provides the advantage that when more than one object is supported by the support arrangement, it is very simple to guarantee that all objects are submerged into the liquid for the same duration of time. It is only necessary to continuously "rotate them through" the liquid.

In a preferred embodiment the object is thermally shielded from the liquid during heating the liquid to the second temperature, i.e., while it is disposed in a portion of the interior cavity above the free liquid surface after the hot isostatic pressing stage.

Generally, the step of thermally shielding the object from the liquid during heating the liquid to the second temperature is carried out by moving a movable heat shield such that it is arranged in a position between the free liquid surface and the object when the object has been arranged outside the liquid in a portion of the interior cavity above the free liquid surface. The heat shield is then moved such that it is spaced from a position between the free liquid surface and the object—i.e., such that it is not in such position—after the liquid has been heated to the second temperature.

In this regard, it is, in principle, possible to provide the movable heat shield such that the heat shield is movable with respect to the object, i.e., such that the heat shield can be selectively inserted into and removed from a location between the object and the free liquid surface while the object is maintained stationary.

However, it is preferred if the heat shield is moved together with the object. In a particularly preferred embodiment, in which the above-mentioned support arrangement is utilized, the heat shield is a portion of the support arrangement. The movement of the heat shield, such that it is arranged in a position between the free liquid surface and the object when the object has been arranged outside the liquid in a portion of the interior cavity above the free liquid surface, is then carried out in a very simple manner by moving the support arrangement inside the interior cavity. Further, the step of submerging the object in the liquid after the liquid has been heated to the second temperature then likewise comprises moving the heat shield by moving the support arrangement inside the interior cavity. The latter movement may be such that the heat shield is submerged in the liquid together with the object or such that the heat shield is at least partially outside the liquid while the object is submerged. In the case of the above-described embodiment, in which the support arrangement is movable in a translational movement, the heat shield may be advantageously constituted by a bottom portion of the support arrangement, on which bottom portion the supported objects rests. It is preferred for such bottom portion to have dimensions smaller than the cross-sectional dimensions of at least a part of the interior cavity to ensure that liquid is able to flow around the edges of the bottom portion when the bottom portion is moved into and out of the liquid.

In a preferred embodiment, the liquid is cooled and/or the interior cavity is depressurized after submerging the object, again within the liquid heated to the second temperature, and subsequently withdrawing the object from the liquid and moving the object into a portion of the interior cavity above the free liquid surface. This simplifies removing the object from the interior cavity and prevents the heat of the liquid to undesirably influence the object.

The material may advantageously be a metal or metal alloy, in particular aluminum or aluminum alloy, titanium or titanium alloy or steel, a thermoplastic material, a ceramic material, or a glass material.

The liquid may be, e.g., an oil, and/or the gas may be, e.g., argon.

A method having one of the above configurations may be used as part of a method for manufacturing an object. The method for manufacturing an object comprises manufacturing an object, and subsequently treating the object using the method of any of the above configurations.

In a preferred embodiment of the method for manufacturing an object, the object is manufactured by additive manufacturing. The additive manufacturing is then preferably selected from the group consisting of selective laser melting, selective laser sintering, selective electron beam melting, selective electron beam sintering and fused deposition modeling.

The above-described method for treating an object, in particular an object manufactured by additive manufacturing, may be carried out advantageously utilizing an apparatus which comprises a pressure chamber having an interior cavity, a support arrangement, a heating means and a gas inlet and outlet.

The support arrangement is adapted to support an object and is located inside the interior cavity. It is movable inside the interior cavity between a first position and a second position, to thereby enable selectively submerging the object in a liquid partially filling the interior cavity and withdrawing the object from the liquid. Generally, the support arrangement can have any of the configurations already described in detail above.

The heating means is adapted for heating a liquid partially filling the cavity to at least two different temperatures, in particular, the first and second temperatures described in detail above. The heating means is adapted to carry out the heating steps mentioned in detail above.

The gas inlet and outlet is constructed and arranged such that through the inlet and outlet gas can be selectively introduced into the interior cavity and vented from the interior cavity. In particular, pressurized gas and/or cooling gas can be introduced into the interior cavity or vented from the interior cavity.

In a preferred embodiment the apparatus further comprises a pressurizing means adapted for pressurizing gas inside the interior cavity.

In a preferred embodiment the support arrangement is mounted in the interior cavity such that the support arrangement is linearly movable between the first and second positions. In an alternative preferred embodiment, the support arrangement is rotationally mounted in the interior cavity such that it is rotationally movable about a fixed rotational axis between the first and second positions.

In a preferred embodiment, the support arrangement comprises a heat shield portion which is adapted to move together with the support arrangement. The heat shield portion, which constitutes the heat shield according to the above-described embodiments and which is preferably plate-shaped, divides, at least in the first position of the support arrangement, the interior cavity into two portions. The two portions change when the position of the support arrangement changes. In this regard it is noted that it is not required for the heat shield portion to provide a seal between the two portions. Rather, it is preferred that at least for some positions, between the first and second positions, a space exists between the heat shield portion and the walls defining the interior cavity in order to allow an exchange of liquid between the two portions when moving the heat shield portion into and out of liquid present in the interior cavity. In any case, the support arrangement is adapted to support the object on one side of the heat shield portion, so that moving the support arrangement into the first position enables positioning the object above a free liquid surface of a liquid partially filling the interior cavity with the heat shield portion being positioned between the object and the free liquid surface. Of course, this requires a suitable filling level of the liquid in the interior cavity, i.e., the level must be adapted to the specific support arrangement and its heat shield portion.

BRIEF DESCRIPTION OF THE DRAWINGS

In the following exemplary embodiments of the method for treating an object and of an apparatus for carrying out the method are described in detail with reference to the attached Figures.

DETAILED DESCRIPTION OF THE PREFERRED EMBODIMENTS

The apparatus 1 shown in FIGS. 1a to 3 comprises a pressure chamber 2 having a cylindrical component 2a, which is closed or can be closed at both ends by a removable upper cover 3 and a lower cover 4, respectively. Inside the pressure chamber 2 an insulating element 5 is arranged which, in turn, defines an interior cavity 6 of the pressure chamber 2. The pressure chamber 2 is supported on a support table 8, which is likewise part of the apparatus 1.

In a lower portion 11 of the interior cavity 6 a heating element arrangement 10 is disposed, and in operation this lower portion 11 is filled with oil (only a surface 18 of the oil is schematically shown for the purpose of illustration in FIGS. 1b, 2a, 2b and 3), wherein the heating element arrangement 10 is operable to selectively heat the oil to different temperatures.

The remainder of the interior cavity 6 constitutes an upper portion 12 of the cavity 6, which portion 12 is located above the surface 18 of the oil when the lower portion 11 is filled with oil. The lower portion 11 and the upper portion 12 and their relative proportions change with the fill level of the oil in the interior cavity 6 and with the corresponding change of the position of the surface 18 of the oil. At any time, the lower portion 11 is the portion of the interior cavity filled with oil, and the upper portion 12 is the or a portion of the interior cavity above the free liquid surface 18.

Inside the cavity 6 a cage 13 is disposed, which is selectively movable by means of a bar 14, which is coupled at one end to the cage 13 and with the other end extends upwardly out of the interior cavity 6 through the upper cover 3 into an extension 13a provided on the upper surface of the cover 3 and having the shape of a hollow cylinder, the axial end opposite the upper cover 3 being closed. The cage 13 is generally cylindrical and comprises on open top, a wire mesh sidewall 16 and a plate-shaped circular closed bottom wall 15 made of a thermally insulating material.

Figure 1A:
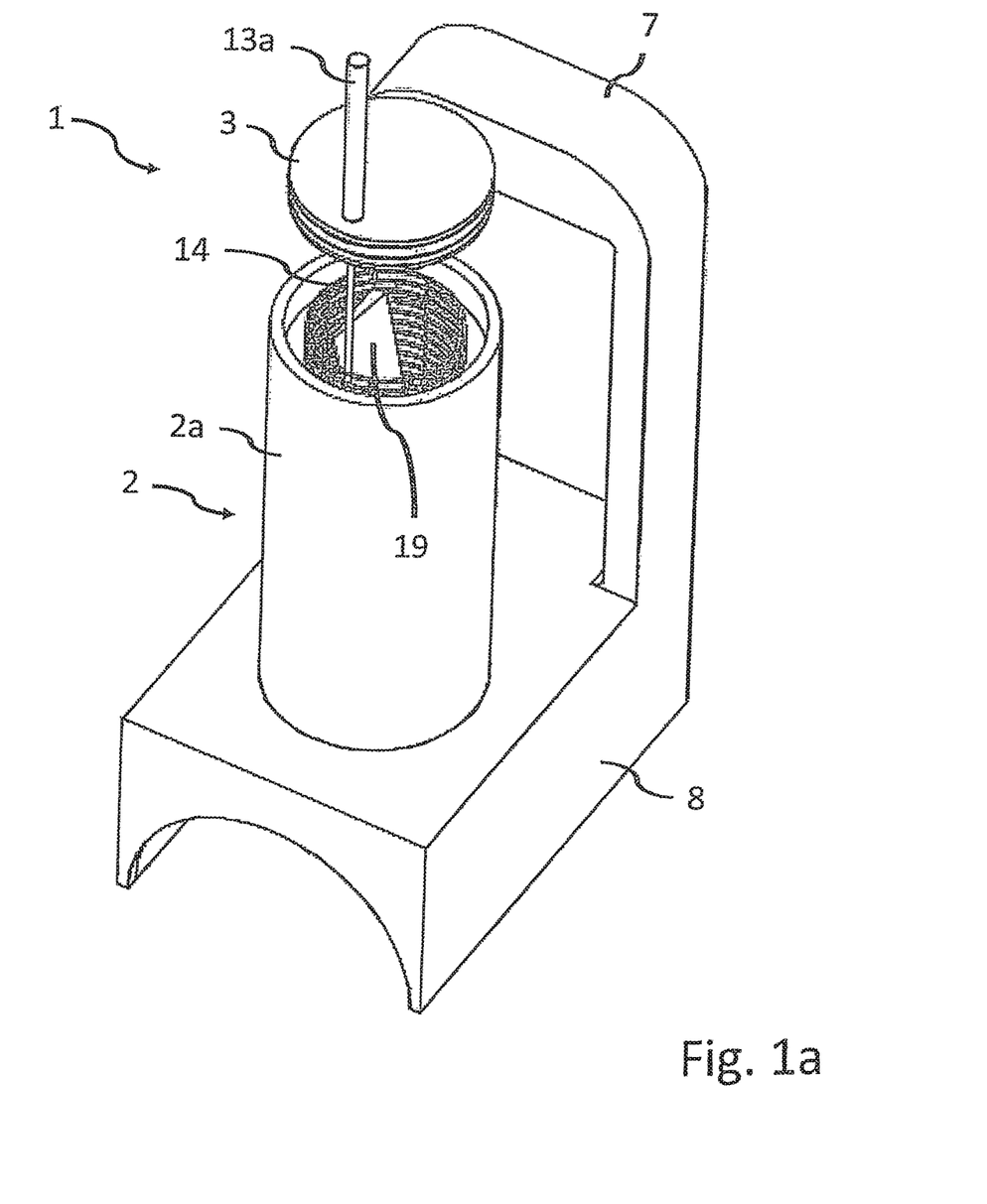
FIG. 1a shows a perspective view of an exemplary embodiment of an apparatus for carrying out a method according to the present invention for treating an object—in particular produced by additive manufacturing—in a pressurized liquid, wherein the apparatus is shown in an open condition in which the object can be inserted into and removed from the apparatus.
Figure 1B:
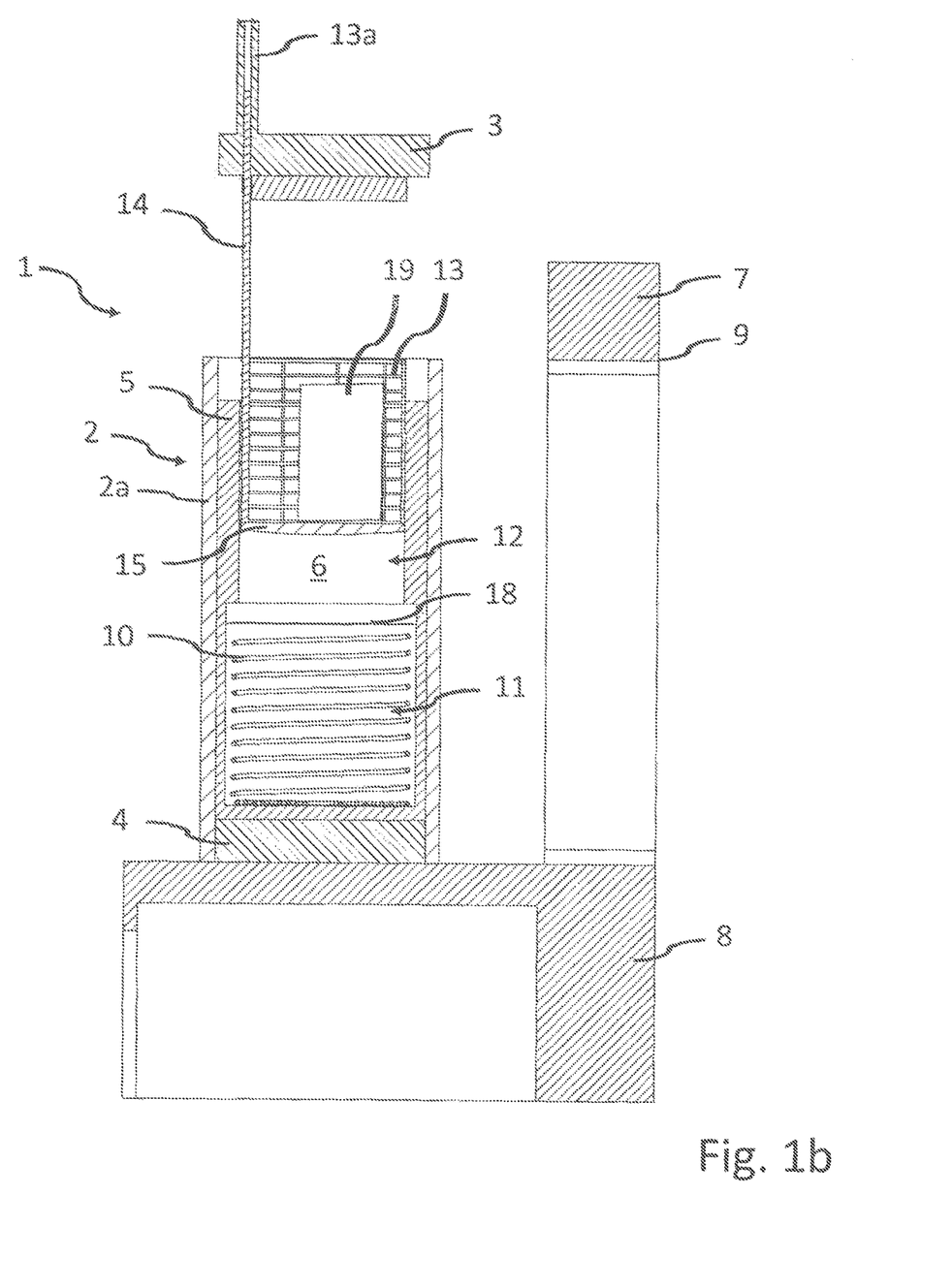
FIG. 1b shows a cross sectional view of the apparatus of FIG. 1a in the open condition.

In FIGS. 1a and 1b the pressure chamber 2 is shown with the upper cover 3 removed, so that the interior cavity 6 is accessible for introducing an object 19 to be treated into the interior cavity 6 and removing it therefrom. More specifically, the object 19 is introduced into and removed from the cage 13, which serves as a support arrangement for the object 19. Of course, it is also possible to arrange more than one object 19 in the cage 13 in order to treat several objects 19 at the same time. Inside the cage 13 the one or more objects 19 are preferably supported entirely or at least in part on the bottom wall 15.

Figure 2A:
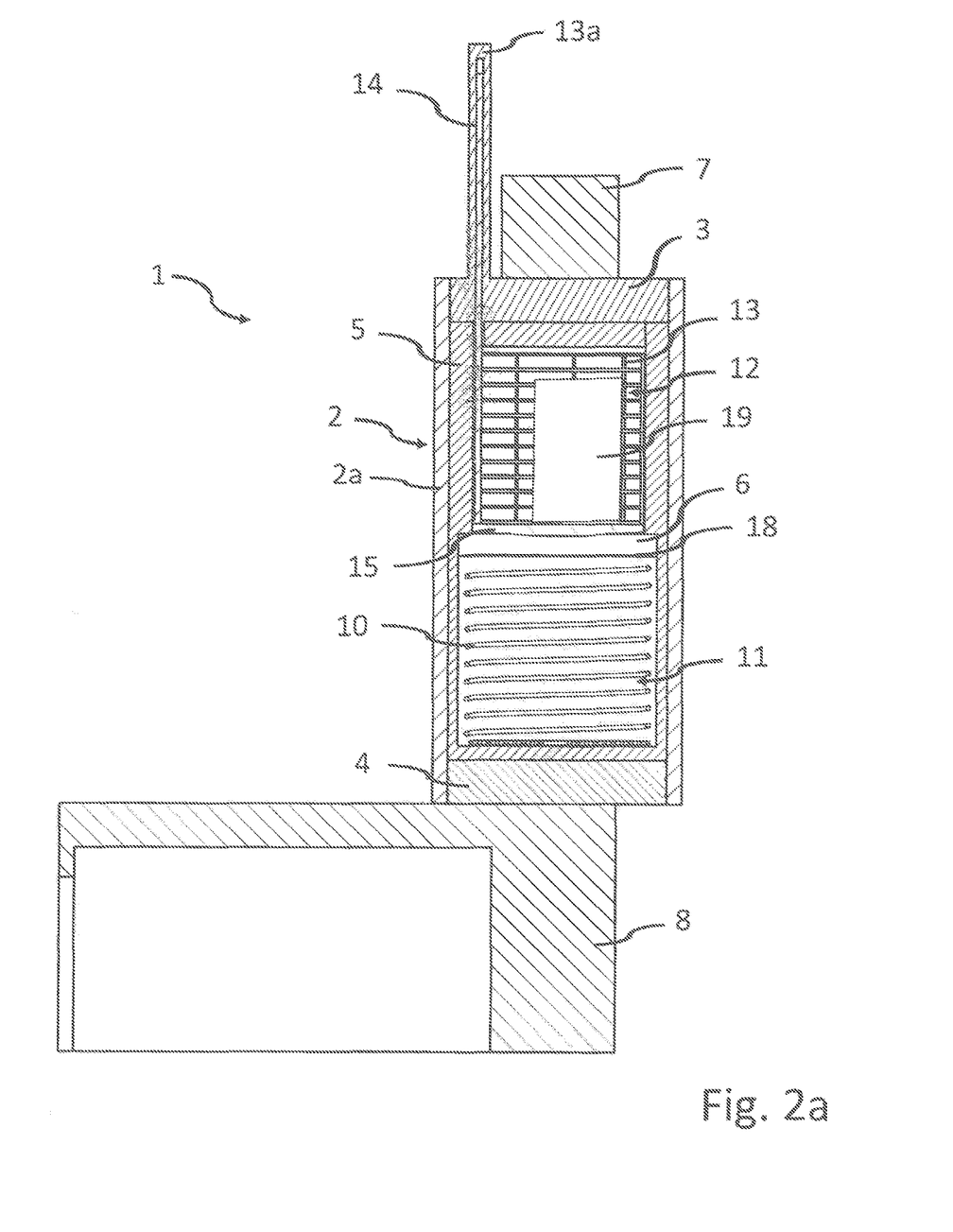
FIG. 2a shows another cross sectional view of the apparatus of FIG. 1a in a condition in which the apparatus is closed and the object is located above a liquid present in the apparatus.
Figure 2B:
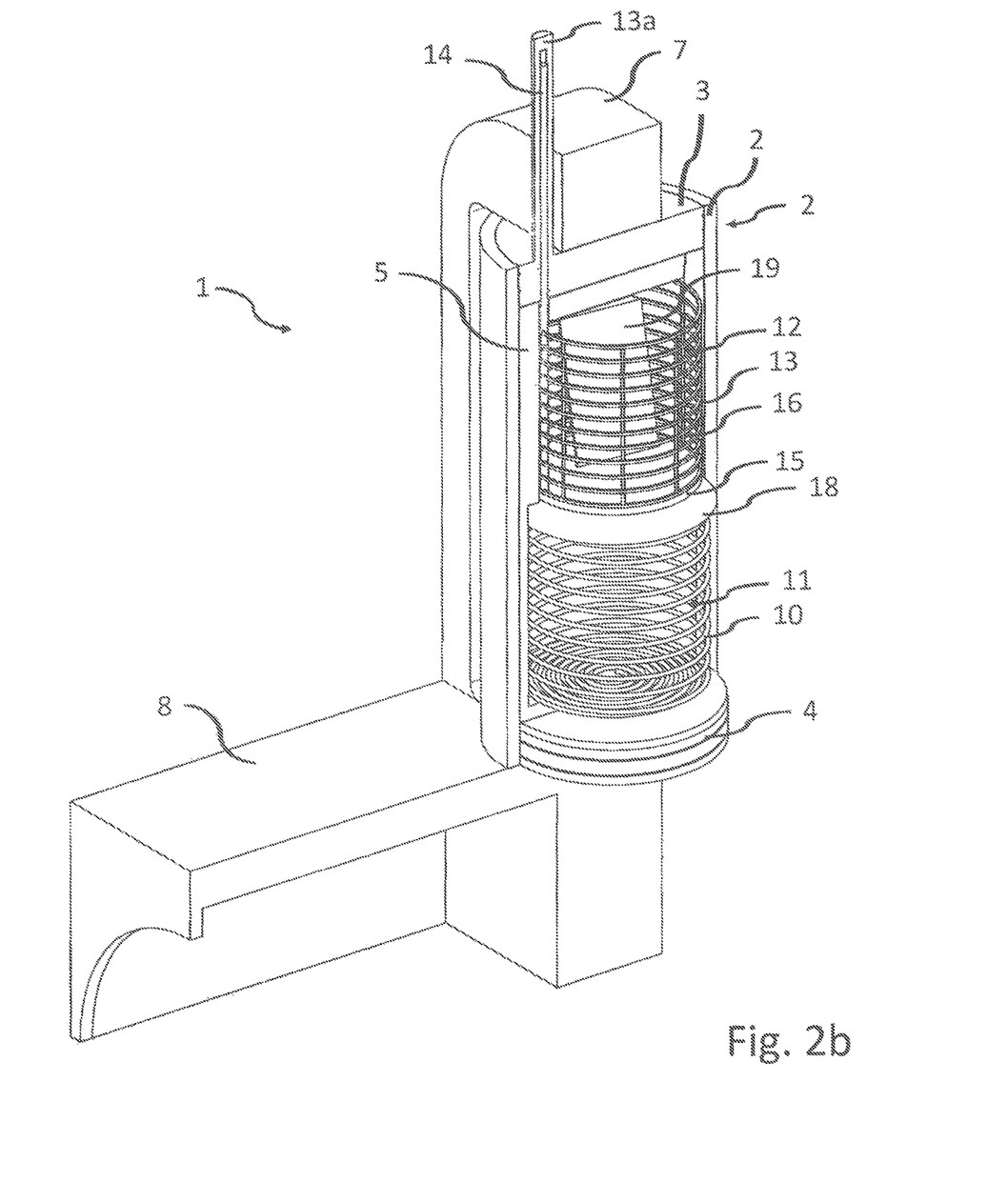
FIG. 2b shows a perspective view of the apparatus of FIG. 1a corresponding to the cross sectional view of FIG. 2a, wherein a part of the housing of the pressure chamber has been removed to make visible the interior of the pressure chamber.
Figure 3:
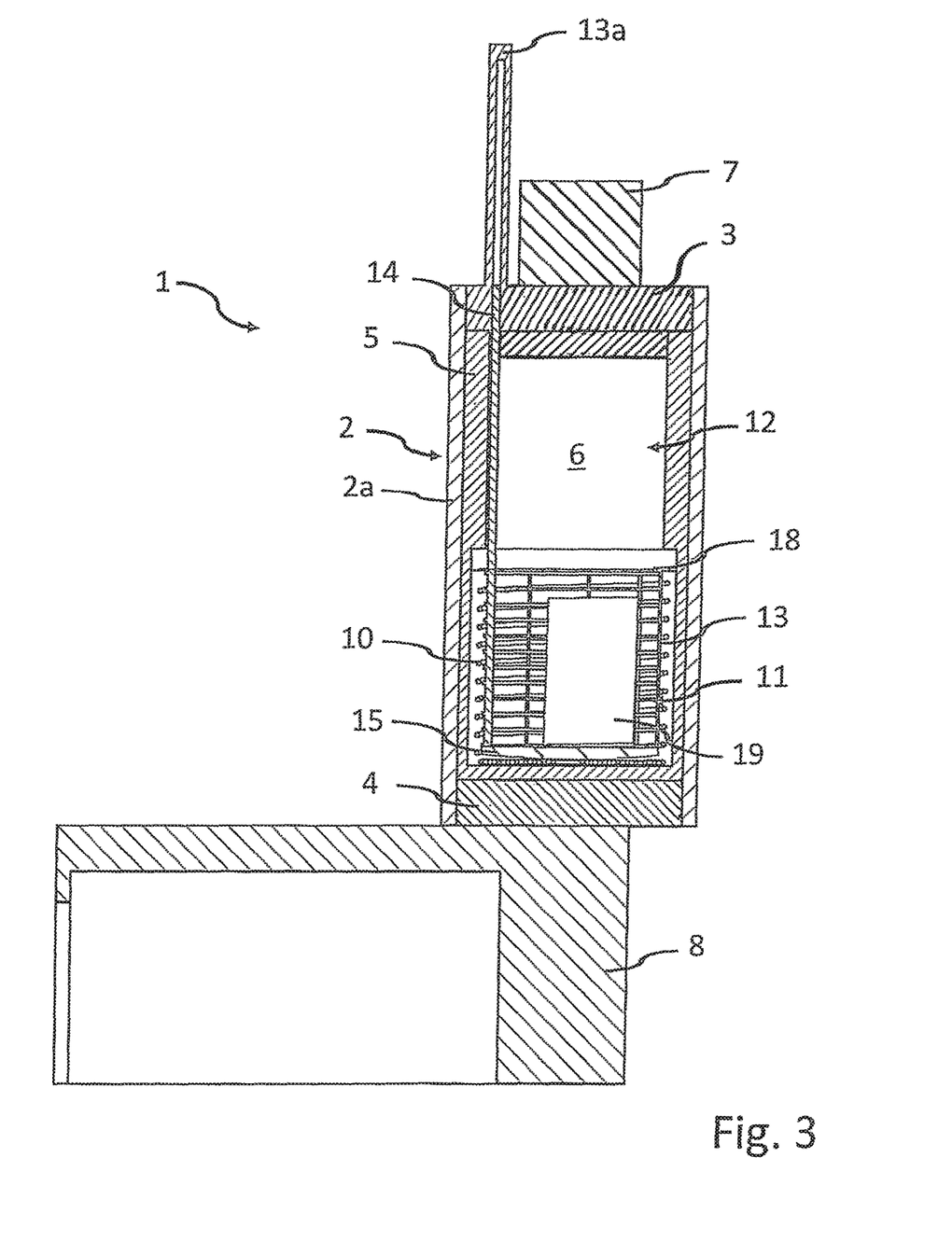
FIG. 3 shows another cross sectional view of the apparatus of FIG. 1a in a condition in which the object is submerged into the liquid.

For actually treating the object 19 or objects 19 inside the interior cavity 6, the pressure chamber 2 is closed by means of the upper cover 3, as shown in FIGS. 2a to 3. Moreover, as likewise illustrated in FIGS. 2a to 3, the pressure chamber 2 is located on the table 8 such that a ring-shaped component 7, 8, which comprises a U-shaped bracket 7 and a portion of the support table 8, is extending annularly around the pressure chamber 2 over the top and bottom covers 3, 4 and applies pressure to the top and bottom covers 3, 4 to assist in securely maintaining them in the closed position. By contrast, in FIGS. 1a and 1b, the pressure chamber 2 has been removed from the opening 9 provided by the ring-shaped component 7, 8, and is supported on the table 8 spaced from the U-shaped bracket 7 in order to allow for removal of the upper cover 3.

In this closed condition of the pressure chamber 2, the cage 13 is movable by means of the bar 14 between an uppermost first position shown in FIGS. 2a and 2b and a lowermost second position shown in FIG. 3. In the uppermost first position the cage 13 is completely disposed above the surface 18 of the oil, i.e., in the upper portion 12 of the interior cavity 6. By contrast, in the lowermost second position the cage 13 is completely submerged in the oil. Due to the fact that the cage 13 is open at the top and the wire mesh sidewall 16 provides multiple openings, oil can enter the cage 13 when moving the cage 13 from the first position into the oil and the second position. For this purpose, the insulating element 5, which has the shape of a hollow cylinder, has an inner diameter which is smaller in an upper region than in a lower region, and the diameter of the bottom wall 15 corresponds to the inner diameter of the insulating element 5 in the upper region. Consequently, when moving the bottom wall 15 into the lower portion 11 upon moving the cage 13 from the first position into the oil and the second position, the oil is able to flow around the circumferential edge of the bottom wall 15 such that it can enter the cage 13 through the sidewall 16 and the open top. Similarly, when moving the cage 13 from the second position into the first position oil present in the cage 13 can leave the cage 13 through the sidewall 16 and flow downwardly around the circumferential edge of the bottom wall 15.

The bottom wall 15 of the cage 13 constitutes a heat shield against hot oil in the lower portion 11 when the cage is in the uppermost position shown in FIGS. 2a and 2b. In this position the inner diameter of the insulating element 5 is essentially closed by the bottom wall 15, because the bottom wall 15 is disposed in the upper portion 12 of the interior cavity 6, so that the interior of the cage 13 and any object 19 located therein is thermally shielded from the heat of the oil.

With this apparatus 1 it is possible in a very simple and efficient manner to reliably and consistently reduce both the porosity and the surface roughness of an object, in particular an object manufactured by additive manufacturing.

In a first step of the method, hot isostatic pressing is carried out by moving the cage 13 together with one or more objects 19 supported therein into the lowermost position, thereby completely submerging the cage 13 and the one or more objects 19 inside the oil disposed in the lower portion 11 of the cavity 6 (see FIG. 3). In this situation, the oil has been or is heated to a first temperature below the melting temperature of the one or more objects 19 to be treated, and the interior cavity 6 has been or is pressurized. The cage 13 is maintained in this lowermost position until a desired reduction in the porosity of the one or more objects 19 has been achieved, as explained in detail above. The objects 19 may be made of, e.g., aluminum or titanium.

Subsequently, the hot isostatic pressing is terminated by moving the cage 13, together with the one or more objects 19, upwardly into the uppermost position shown in FIGS. 2a and 2b, thereby removing the one or more objects 19 from the oil. In this position the bottom wall 15 provides a continuous closed heat shield separating the one or more objects 19 from the oil and shielding the one or more objects from any heat radiated by the surface 18 of the oil. The heating element arrangement 10 is then utilized to further heat the oil to a second temperature above the melting temperature of the material from which the one or more objects are made. During this time, the one or more objects may be cooled by the pressurized gas present in the upper portion 12 to prevent any heat not shielded by the heat shield 15 negatively affecting the one or more objects 19.

Once the second temperature has been reached, the cage 13, together with the one or more objects, is moved again into the position shown in FIG. 3 to briefly submerge or dip into the oil such that only the outermost layer or a few outermost layers of the one or more objects 19 melt, so that a reduction in the surface roughness and surface irregularities is achieved without deformation of the one or more objects 19. For example, the one or more objects may be maintained in the oil until a surface roughness of 1 µm or less is achieved. Then, the one or more objects 19 are again withdrawn from the oil by moving the cage 13 into the position shown in FIGS. 2a and 2b, and subsequently the oil is cooled and depressurized.

FIGS. 4a to 5d show another exemplary embodiment of an apparatus 101 adapted for carrying out a method for treating an object—in particular manufactured by additive manufacturing—from a material having a defined melting temperature. The apparatus 101 comprises a pressure chamber 102 having a generally cylindrical portion 102a, which is closed or can be closed at both ends by a removable dome-shaped first cover 103 and an integrally formed dome-shaped second cover 104, respectively. Inside the pressure chamber 102 an insulating element 105 is arranged which in turn defines an interior cavity 106 of the pressure chamber 102. The pressure chamber 102 is supported on legs 102b such that the longitudinal axis of cylindrical portion 102 is oriented horizontally.

In a lower portion 111 of the interior cavity 106 a heating element arrangement 110 is disposed, and in operation this lower portion 111 is filled with oil (only a surface 118 of the oil is schematically shown for the purpose of illustration in FIGS. 5a to 5e), wherein the heating element arrangement 110 is operable to selectively heat the oil to different temperatures.

The remainder of the interior cavity 106 constitutes an upper portion 112 of the cavity 106, which portion 112 is located above the surface 118 of the oil when the lower portion 111 is filled with oil. Again, the lower portion 111 and the upper portion 112 and their relative proportions change with the fill level of the oil in the interior cavity 106 and with the corresponding change of the position of the surface 118 of the oil. At any time, the lower portion 111 is the portion of the interior cavity filled with oil, and the upper portion 112 is the or a portion of the interior cavity above the free liquid surface 118.

Inside the cavity 106 an elongate support element 113 is disposed, which is mounted such that it is rotatable about the longitudinal axis 113a of the cylindrical portion 102a. The support element 113 comprises a cylindrical core 113b and a plurality of disk-shaped mounting plates 113c extending radially from the core 113b and spaced from each other. Further, a planar plate-shaped wall portion 115, made of a thermally insulating material, is secured to the core 113b and extends along the entire length of the cavity 106 at a location spaced from the rotational axis.

Figure 4A:
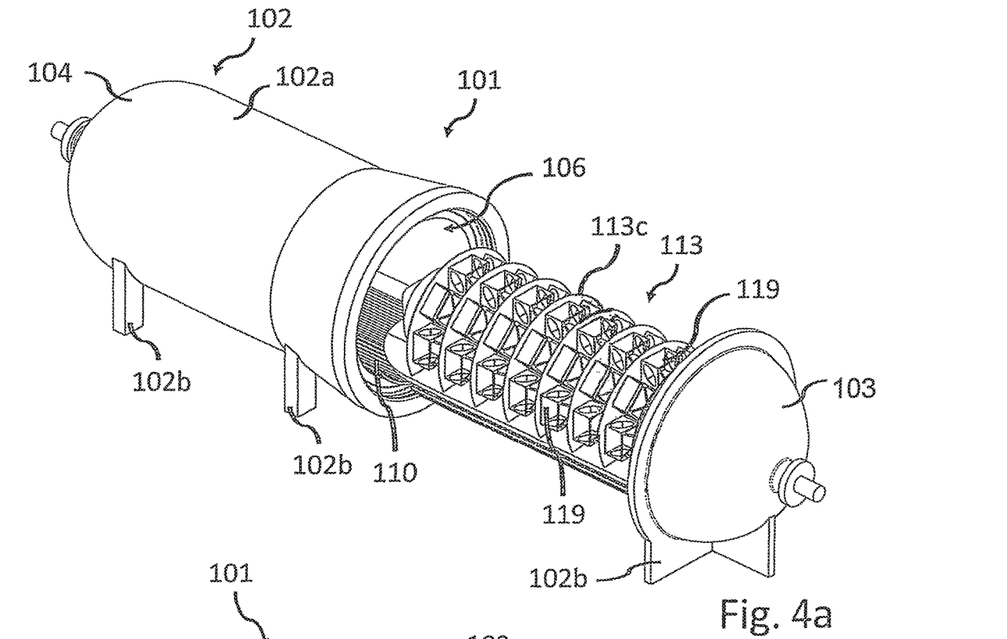
FIG. 4a shows a perspective view of another exemplary embodiment of an apparatus for carrying out a method according to the present invention for treating objects—in particular produced by additive manufacturing—in a pressurized liquid, wherein the apparatus is shown in an open condition in which the object can be inserted into and removed from the apparatus.

In FIG. 4a the pressure chamber 102 is shown with the first cover 103 removed, so that the interior cavity 106 is accessible for introducing multiple objects 119 to be treated into the interior cavity 106 and removing them therefrom. More specifically, the objects 119 are mounted to the mounting plates 113c on one side of the wall portion 115.

Figure 4B:
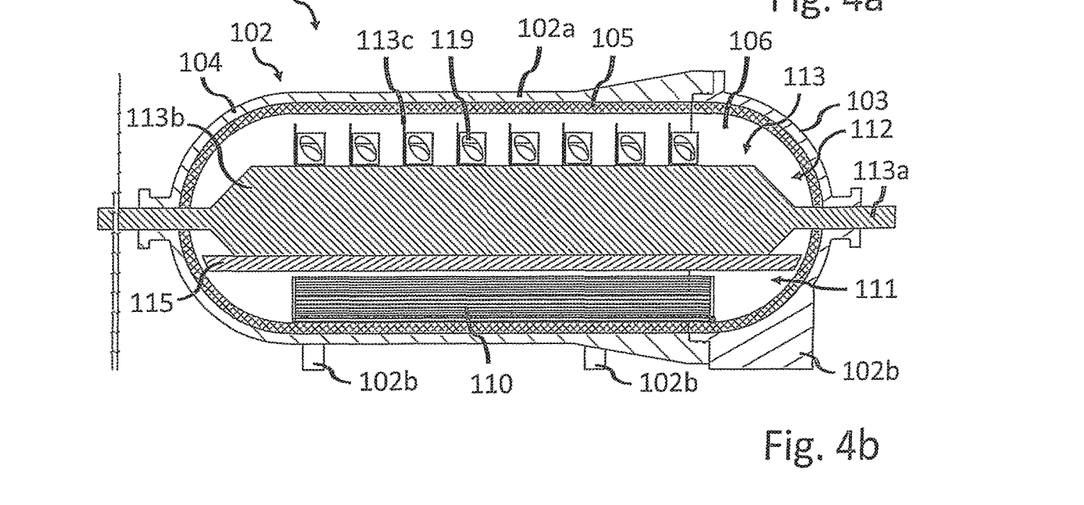
FIG. 4b shows a cross sectional view of the apparatus of FIG. 4a in a condition in which the apparatus is closed and the objects are located above a liquid present in the apparatus.
Figure 5A:
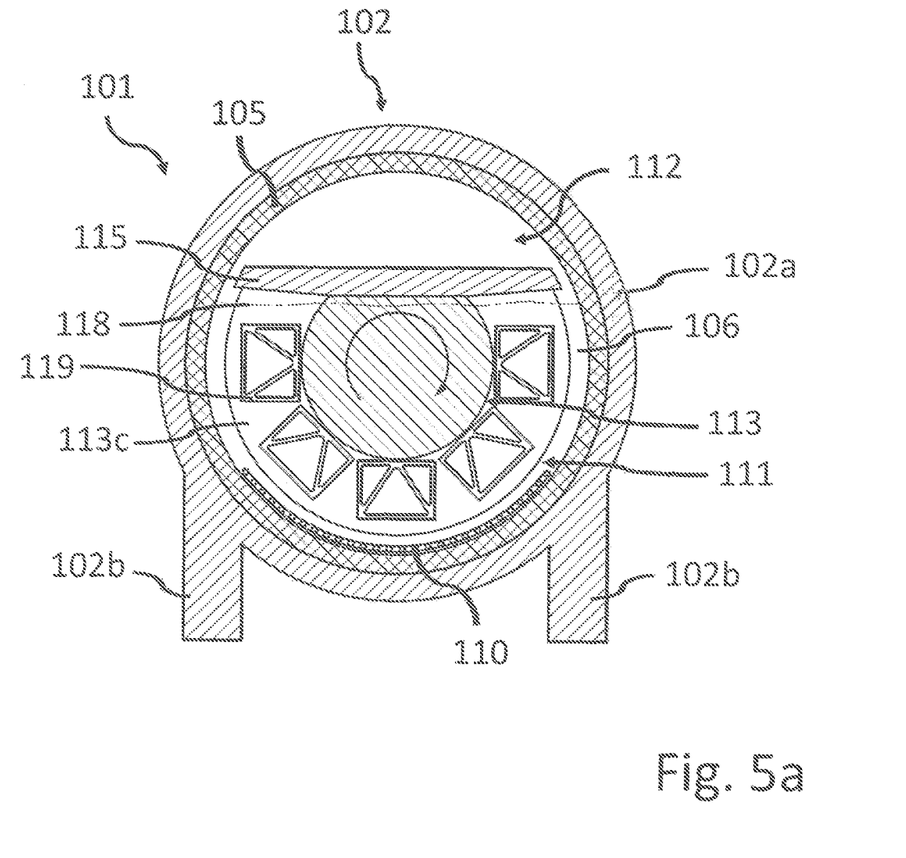
FIG. 5a shows another cross sectional view of the apparatus of FIG. 4a in the condition of FIG. 4b, wherein a support arrangement for the object is in a second position.

For actually treating the objects 119 inside the interior cavity 106, the pressure chamber 102 is closed by means of the cover 103, as shown in FIG. 4b. The method is illustrated in FIG. 6 together with FIGS. 5a to 5e.

Figure 5B:
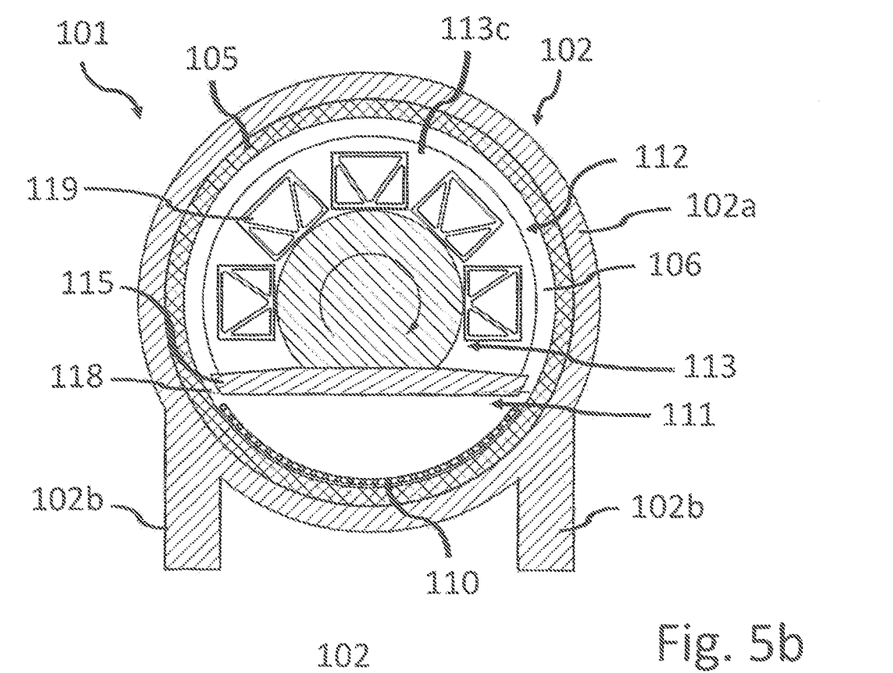
FIG. 5b shows a cross sectional view of the apparatus of FIG. 4a, wherein the support arrangement is in a first position.
Figure 5C:
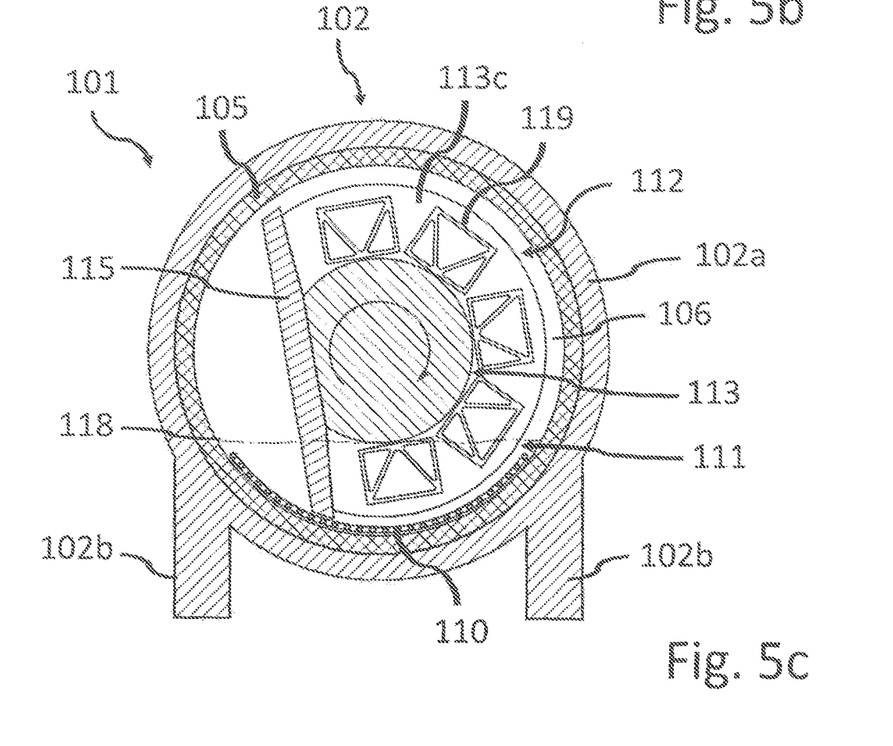
FIG. 5c shows a cross sectional view of the apparatus of FIG. 4a, wherein the support arrangement has been rotated from the first position shown in FIG. 5b in the direction of the second position.
Figure 5D:
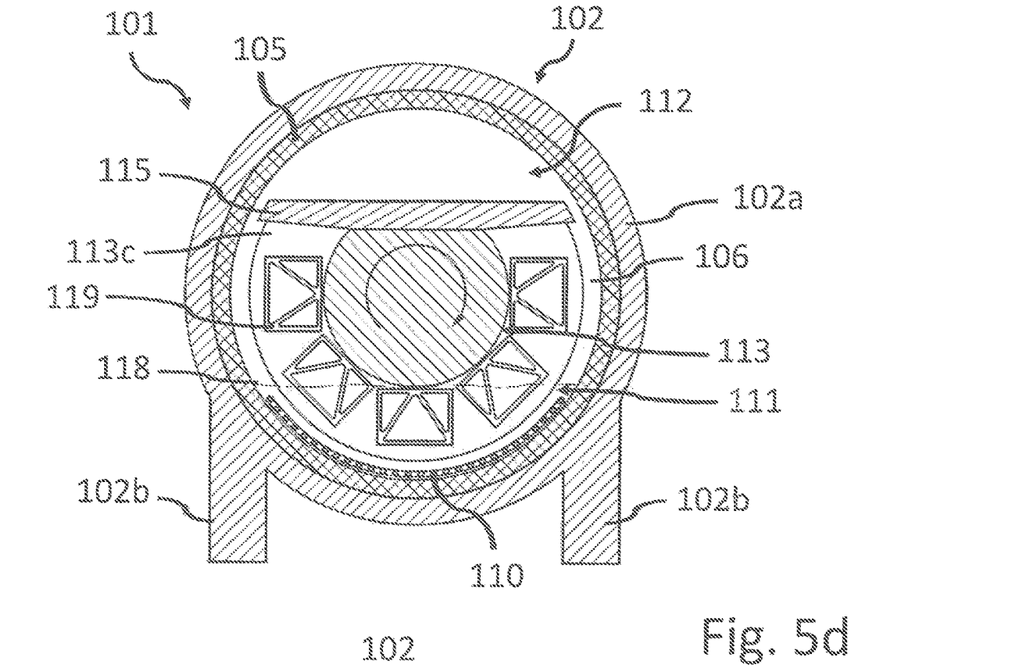
FIG. 5d shows a cross sectional view of the apparatus of FIG. 4a, wherein the support arrangement has been rotated further from the position of FIG. 5c and is now in the second position.
Figure 5E:
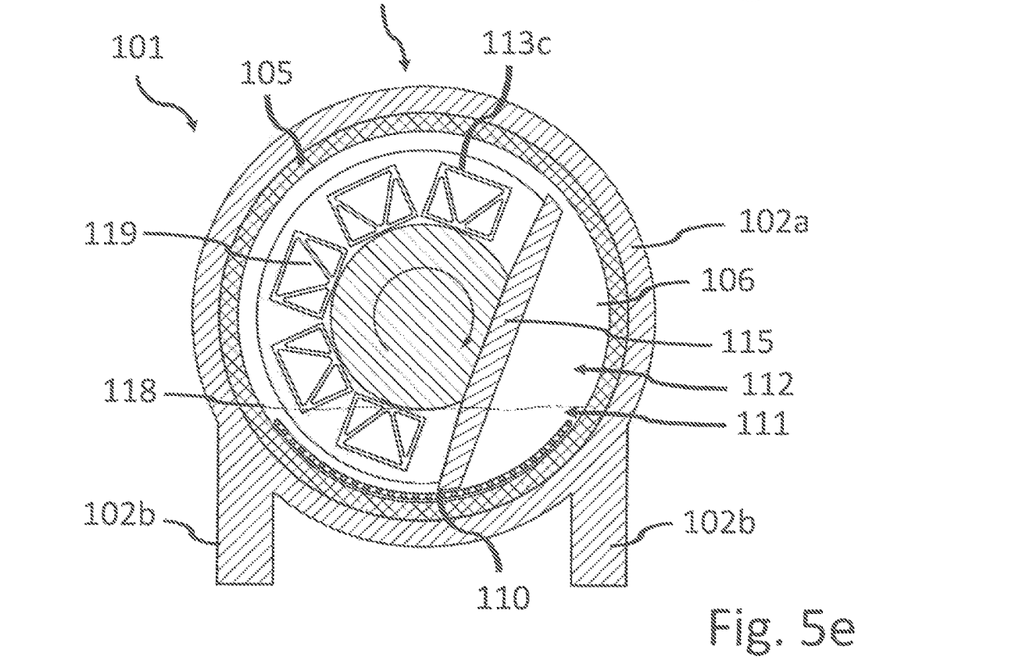
FIG. 5e shows a cross sectional view of the apparatus of FIG. 4a, wherein the support arrangement has been rotated from the second position shown in FIG. 5d in the direction of the first position.
Figure 6:
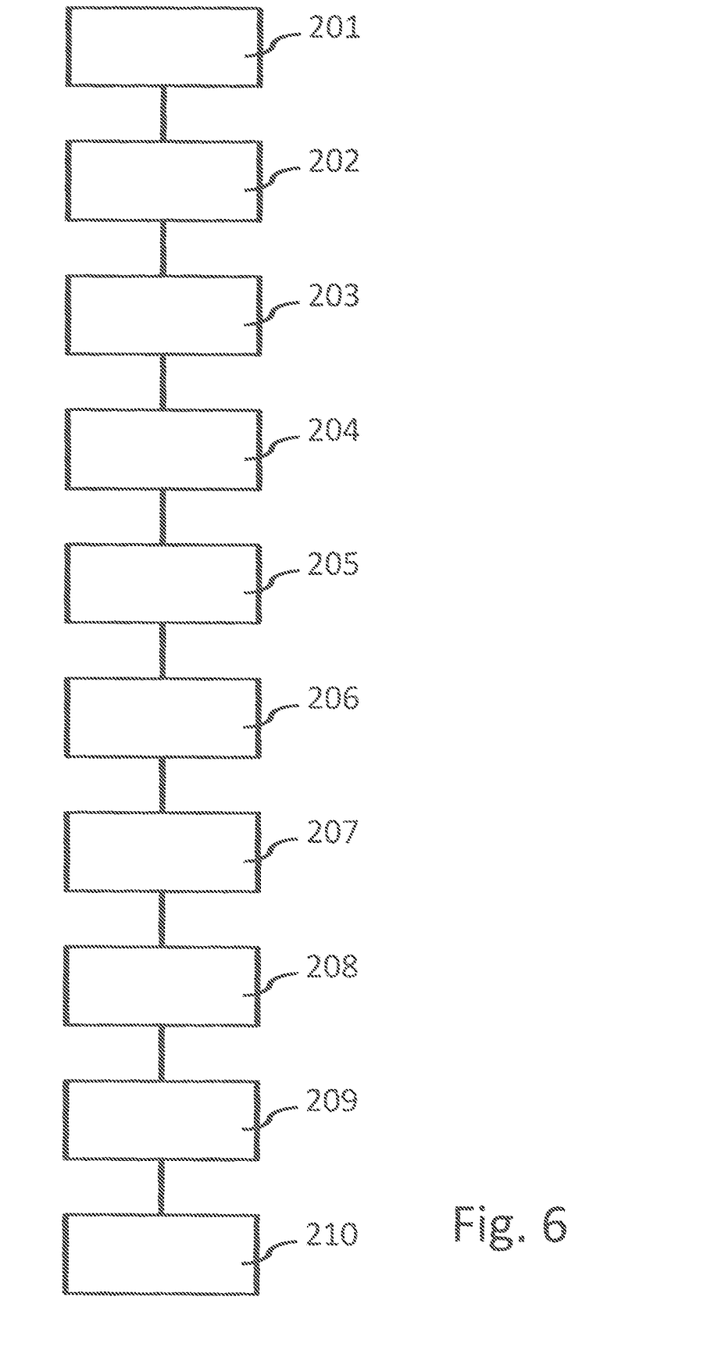
FIG. 6 shows a flow chart of a method for manufacturing an object including a method for treating an object, in particular an object manufactured by additive manufacturing.

In this closed condition of the pressure chamber 102 the support element 113 is rotationally movable in a defined rotational direction from a first position shown in FIG. 5b into a second position shown in FIGS. 5a and 5d and back again into the first position via intermediate positions illustrated in FIGS. 5c and 5e. As will be explained in more detail below, in FIG. 5a, corresponding to the hot isostatic pressing stage, the fill level of the oil is higher than in FIGS. 5b to 5e showing the subsequent roughness reducing stage. In the second position, and with the fill level as in FIG. 5a, all objects 119 mounted on the support element 113 are submerged in the oil, i.e., completely disposed inside the oil. With the fill level as in FIGS. 5b to 5e, in the first position the support element 113 and the objects 119 mounted thereto are completely disposed above the surface 118 of the oil, i.e., in the upper portion 112 of the interior cavity 106. By contrast, in each of the positions illustrated in FIGS. 5b to 5d, at least another one of the objects 119 is submerged in the oil, possibly together with a part of the wall portion 115. The dimensions of the wall portion 115 are chosen such that they generally correspond to the inner dimensions of the interior cavity 106 in the plane in which the wall portion 115 extends, but that that the circumferential edge of the wall portion 115 is spaced from the interior wall of the pressure chamber 102 defining the cavity 106. Consequently, when rotating the support element 113 through the positions of FIGS. 5a to 5e such that the parts of the wall portion 115 move into and out of the oil, the oil is able to flow around the circumferential edge of the wall portion 115 such that it can remain below the wall portion 115.

The wall portion 115 of the support element 113 constitutes a heat shield against hot oil in the lower portion 111 when the support element 113 is in the first position shown in FIG. 5b. The upper portion 112, in which all objects 119 are located in this position, is then thermally shielded from the heat of the oil by the wall portion 115.

With this apparatus 101 it is likewise possible in a very simple and efficient manner to reliably and consistently reduce both the porosity and the surface roughness of objects 119, in particular of objects 119 manufactured by additive manufacturing.

In a first step of the method, hot isostatic pressing is carried out with the fill level of oil as in FIG. 5a by rotating the support element 113 together with the objects 119 supported thereon into the second position shown in FIG. 5a. Before, during or after this the oil has been filled to the level of FIG. 5a and has been or is heated to a first temperature below the melting temperature of the objects 119 to be treated, and the interior cavity 106 has been or is pressurized. The process is continued until a desired reduction in the porosity of the objects 119 has been achieved, as explained in detail above. The objects 119 may again be made of, e.g., aluminum or titanium.

Subsequently, the hot isostatic pressing is terminated by moving the support element 113 into the first position shown in FIG. 5b and lowering the fill level to the one shown in FIGS. 5b to 5e, thereby removing the objects 119 from the oil. In this position the wall portion 115 provides a continuous essentially closed heat shield separating the objects 119 from the oil and shielding the objects 119 from any heat radiated by the surface 118 of the oil, as already mentioned above. The heating element arrangement 110 is then utilized to further heat the oil to a second temperature above the melting temperature of the material from which the objects 119 are made. During this time, the objects 119 may be cooled by the pressurized gas present in the upper portion 112 to prevent any heat not shielded by the heat shield 115 from negatively affecting the objects 119.

Once the second temperature has been reached, the support element 113, together with the objects 119, is rotated once or several times in the defined rotational direction through the positions shown in FIGS. 5b to 5e, to briefly submerge or dip each of the objects 119 into the oil such that only the outermost layer or a few outermost layers of the objects 119 melt, so that a reduction in the surface roughness and surface irregularities is achieved without deformation of the objects 119. For example, the objects 119 may be maintained in the oil until a surface roughness of 1 μm or less is achieved. During this rotation, the objects 119 mounted in an essentially semi-circular arrangement to each of the mounting plates 113c are completely submerged one after the other inside the oil disposed in the lower portion 111 of the cavity 106 (see FIGS. 5c to 5e). Then, the objects 119 are again withdrawn from the oil by moving the support element 113 into the position shown in FIG. 5b and maintaining it there, and subsequently the oil is cooled and depressurized. It is noted that the treatment time of the objects 119 inside the oil can be adjusted by modifying the number of rotations and/or the rotational speed of the support element 113.

Consequently, a method illustrated in FIG. 6 for manufacturing an object 19, 119 generally comprises a step 201 in which an object 19, 119 is manufactured, in particular by additive manufacturing. Subsequently, the object 19, 119 is subjected to hot isostatic pressing for reducing the porosity and increasing the density of the object 19, 119. The hot isostatic pressing comprises the step 202 of arranging the 19, 119 inside the interior cavity 6, 106 of the pressure chamber 2, 102, the step 203 of submerging the object 19, 119 in the oil which is disposed inside the interior cavity 6, 106 and partially fills the interior cavity 6, 106, such that the liquid has a free liquid surface 18, 118 above which a portion 12, 112 of the interior cavity 6, 106 is located. Further, in a step 204 the oil is heated to a first temperature below the melting temperature, in a step 205 the oil is pressurized by providing pressurized gas in a portion 12, 112 of the interior cavity 6, 106 above the free liquid surface 18, 118, in a step 206 the object 19, 119 is maintained inside the oil heated to the first temperature and pressurized by the pressurized gas, and in a step 207 the object 19, 119 is arranged outside the oil in a portion 12, 112 of the interior cavity 6, 106 above the free liquid surface 18, 118. Subsequently, in a step 208, the oil is heated to a second temperature above the melting temperature. After the oil has been heated to the second temperature, in a step 209, the object 19, 119 is moved from a portion 12, 112 of the interior cavity 6, 106 above the free liquid surface 18, 118 into the oil, thereby submerging the object 19, 119 again within the oil for reducing the surface roughness of the object 19, 119. Finally, in a step 210, the object is withdrawn from the oil and moved into a portion 12, 112 of the interior cavity 6, 106 above the free liquid surface 18, 118.

It should be noted that in order to be able to heat oil or other liquids such that the melting temperature of metals like Titan (1668° C.) or Aluminum (660.3° C.) can be reached, a very high pressure is necessary. Such high pressures are advantageously already present due to the preceding hot isostatic pressing stage, which commonly allows heating of the oil up to 2000° C. while pressurized with compressed Argon up to 100-200 MPa.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for treating an object manufactured from a material having a defined melting temperature, wherein the method comprises the following steps:
    subjecting the object to hot isostatic pressing for reducing the porosity and increasing the density of the object, wherein the hot isostatic pressing comprises
        arranging the object inside an interior cavity of a pressure chamber,
        submerging the object in a liquid which is disposed inside the interior cavity and partially fills the interior cavity, such that the liquid has a free liquid surface above which a portion of the interior cavity is located,
        heating the liquid to a first temperature below the melting temperature,
        pressurizing the liquid by providing pressurized gas in a portion of the interior cavity above the free liquid surface,
        maintaining the object inside the liquid heated to the first temperature and pressurized by the pressurized gas, and
        arranging the object outside the liquid in a portion of the interior cavity above the free liquid surface,
    subsequently heating the liquid to a second temperature above the melting temperature,
    after the liquid has been heated to the second temperature, moving the object from a portion of the interior cavity above the free liquid surface into the liquid and submerging the object again within the liquid for reducing the surface roughness of the object, and subsequently withdrawing the object from the liquid and moving it into a portion of the interior cavity above the free liquid surface.

2. The method according to claim 1, wherein the step of heating the liquid to the first temperature is carried out prior to submerging the object in the liquid.

3. The method according to claim 1, further comprising the steps of:
    supporting the object by a support arrangement, which is located inside the interior cavity, and which is movable inside the interior cavity to thereby enable selectively submerging the object in the liquid,
    arranging the object outside the liquid in a portion of the interior cavity above the free liquid surface and
    withdrawing the object from the liquid and moving it into the portion of the interior cavity above the free liquid surface, wherein
    the step of submerging the object in the liquid after the liquid has been heated to the second temperature and the step of withdrawing the object from the liquid and moving it into a portion of the interior cavity above the free liquid surface are carried out by moving the support arrangement inside the interior cavity.

4. The method according to claim 3, wherein
    the step of submerging the object in the liquid heated to the first temperature, or
    the step of arranging the object outside the liquid in a portion of the interior cavity above the free liquid surface
    is carried out by moving the support arrangement inside the interior cavity.

5. The method according to claim 3, wherein moving the support arrangement inside the interior cavity is carried out by moving the support arrangement along a linear path between a first position and a second position.

6. The method according to claim 3, wherein moving the support arrangement inside the interior cavity is carried out by rotating the support arrangement about a rotational axis.

7. The method according to claim 1, further comprising the step of thermally shielding the object from the liquid during heating the liquid to the second temperature.

8. The method according to claim 7, wherein the step of thermally shielding the object from the liquid during heating the liquid to the second temperature is carried out by moving a movable heat shield such that the heat shield is arranged in a position between the free liquid surface and the object when the object has been arranged outside the liquid in a portion of the interior cavity above the free liquid surface.

9. The method according to claim 8, wherein the heat shield is a portion of the support arrangement, and wherein the movement of the heat shield, such that the heat shield is arranged in apposition between the free liquid surface and the object when the object has been arranged outside the liquid in a portion of the interior cavity above the free liquid surface, is carried out by moving the support arrangement inside the interior cavity, and wherein the step of submerging the object in the liquid after the liquid has been heated to the second temperature comprises moving the heat shield by moving the support arrangement inside the interior cavity.

10. The method according to claim 1, wherein after submerging the object again within the liquid heated to the second temperature and subsequently withdrawing the object from the liquid and moving the object into a portion of the interior cavity above the free liquid surface, the liquid is cooled or the interior cavity is depressurized.

11. The method according to claim 1, wherein the manufacturing of the object comprises additive manufacturing.

12. A method for manufacturing an object, comprising manufacturing an object, and
subsequently treating the object by performing the following steps:
  subjecting the object to hot isostatic pressing for reducing the porosity and increasing the density of the object, wherein the hot isostatic pressing comprises
  arranging the object inside an interior cavity of a pressure chamber,
  submerging the object in a liquid which is disposed inside the interior cavity and partially fills the interior cavity, such that the liquid has a free liquid surface above which a portion of the interior cavity is located,
  heating the liquid to a first temperature below the melting temperature,
  pressurizing the liquid by providing pressurized gas in a portion of the interior cavity above the free liquid surface,
  maintaining the object inside the liquid heated to the first temperature and pressurized by the pressurized gas, and
  arranging the object outside the liquid in a portion of the interior cavity above the free liquid surface,
  subsequently heating the liquid to a second temperature above the melting temperature,
  after the liquid has been heated to the second temperature, moving the object from a portion of the interior cavity above the free liquid surface into the liquid and submerging the object again within the liquid for reducing the surface roughness of the object, and subsequently
    withdrawing the object from the liquid and moving it into a portion of the interior cavity above the free liquid surface.

13. The method according to claim 12, wherein the manufacturing of the object comprises additive manufacturing.

14. An apparatus for carrying out a method for treating an object manufactured from a material having a defined melting temperature, comprising:
  a pressure chamber having an interior cavity,
  a support arrangement, adapted to support the manufactured object and being located inside the interior cavity and being movable inside the interior cavity between a first position and a second position, to thereby enable selectively submerging the object in a liquid partially filling the interior cavity and withdrawing the object from the liquid,
  a heater adapted to heat a liquid partially filling the cavity to at least two different temperatures, and
    a gas inlet and outlet through which gas can be selectively introduced into the interior cavity and vented from the interior cavity,
  wherein the support arrangement comprises a heat shield portion adapted to move together with the support arrangement and which, at least in the first position of the support arrangement, divides the interior cavity into two portions, wherein the support arrangement is adapted to support the object on one side of the heat shield portion, so that moving the support arrangement into the first portion enables positioning the object above a free liquid surface of a liquid partially filling the interior cavity with the heat shield portion being positioned between the object and the free liquid surface.

15. The apparatus according to claim 14, wherein the support arrangement is mounted in the interior cavity such that it is linearly movable between the first and second positions.

16. The apparatus according to claim 14, wherein the support arrangement is rotationally mounted in the interior cavity such that it is rotationally movable about a fixed rotational axis between the first and second positions.

* * * * *